United States Patent
Santangelo et al.

(10) Patent No.: US 12,553,474 B2
(45) Date of Patent: Feb. 17, 2026

(54) CO-MOULDABLE TUBE

(71) Applicant: Aktiebolaget SKF, Gothenburg (SE)

(72) Inventors: Piero Santangelo, Turin (IT); Riccardo Restivo, Turin (IT); Enzo Amico, Moncalieri (IT); Giuseppe Grassi, Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 33 days.

(21) Appl. No.: 18/749,767

(22) Filed: Jun. 21, 2024

(65) Prior Publication Data

US 2025/0003448 A1   Jan. 2, 2025

(30) Foreign Application Priority Data

Jun. 28, 2023 (IT) .................. 102023000013458

(51) Int. Cl.
*F16C 19/54* (2006.01)
*D06F 37/26* (2006.01)
*F16C 35/077* (2006.01)

(52) U.S. Cl.
CPC .......... *F16C 35/077* (2013.01); *D06F 37/269* (2013.01); *F16C 19/54* (2013.01); *F16C 2208/04* (2013.01); *F16C 2208/76* (2013.01); *F16C 2220/04* (2013.01); *F16C 2220/06* (2013.01); *F16C 2226/70* (2013.01); *F16C 2314/00* (2013.01)

(58) Field of Classification Search
CPC ........ F16C 19/06; F16C 19/54; F16C 19/545; F16C 35/077; F16C 2208/04; F16C 2208/76; F16C 2220/04; F16C 2220/06; F16C 2226/70; F16C 2314/00; D06F 37/269

See application file for complete search history.

(56) References Cited

U.S. PATENT DOCUMENTS 7,862,871 B2   1/2011   Caudevilla et al.
2011/0232337 A1   9/2011   Mola et al.

FOREIGN PATENT DOCUMENTS

| DE | 69632856 T2 | 6/2006 | |
|---|---|---|---|
| EP | 1950334 A1 | 7/2008 | |
| EP | 1563135 B1 | 2/2013 | |
| IT | TO20100181 A1 | 9/2011 | |
| WO | WO-2007138029 A1 * | 12/2007 | ............ A47J 43/085 |

OTHER PUBLICATIONS

Examination Report of the National Intellectual Property Office of Italy in Application No. 102023000013458, dated Jan. 31, 2024; 8pgs.

* cited by examiner

*Primary Examiner* — Phillip A Johnson
(74) *Attorney, Agent, or Firm* — Stinson LLP

(57) ABSTRACT

A co-mouldable tube (10) includes with two rolling bearings (20) arranged along a respective axis (A) of rotation. A spacer (40) is interposed between the two rolling bearings (20) so as to give the co-mouldable tube (10) structural rigidity. A cylindrical containment sleeve (5) is co-moulded around the two rolling bearings (29) and the spacer (40). Two metal bushes (60) are interposed between the cylindrical sleeve (50) and the two rolling bearings (20) so as to be co-moulded together with the said cylindrical sleeve (50).

7 Claims, 2 Drawing Sheets

CO-MOULDABLE TUBE

CROSS-REFERENCE TO RELATED APPLICATION

This application claims priority to Italian Application No. 102023000013458, filed Jun. 28, 2023, the entirety of which is hereby incorporated by reference.

FIELD

The present disclosure relates to a co-mouldable tube.

The present disclosure relates, in particular, to a tube co-mouldable with washing machine tubs to which the following description will expressly refer without thereby losing its general character.

BACKGROUND

Tubes which can be co-moulded with washing machine tubs are designed to form an integral part of the said tubs in order to facilitate the washing machine assembly operations and must support the rotating component of the tub, namely the drum.

The tubes co-mouldable with washing machines, of the known type, usually comprise:

- two rolling bearings arranged along an axis of rotation of a washing machine drum;
- a spacer interposed between the two rolling bearings and made of generally plastic material and having a box-like structure which confers structural rigidity to the tube; and
- a cylindrical containment sleeve made of plastic material and formed by means of co-moulding around the two bearings and the spacer.

In the co-mouldable tubes of the type described above, the two rolling bearings are directly mounted in the opposite ends of the spacer and are also embedded inside the cylindrical containment sleeve. Moreover, the spacer, apart from conferring structural rigidity to the sleeve, has the main function in particular of keeping the two rolling bearings at a given axial distance from each other, these being provided with respective circumferential outer grooves which, during co-moulding of the sleeve, are filled with the same material as the sleeve so as to increase the axial and radial gripping between the sleeve and the said rolling bearings. In other words, the two rolling bearings form an integral part of the cylindrical containment sleeve and it is practically impossible to carry out maintenance on them in the event of malfunctioning thereof, it being required in the most critical cases to replace the entire tub since it also forms an integral part of the said co-mouldable tube.

Furthermore, owing to the need to make the two rolling bearings angularly stable with respect to the cylindrical sleeve, it is required to provide circumferential outer grooves which, since they must be machined on the steel of the rolling bearings, result in additional production costs.

SUMMARY

The object of the present disclosure is to provide a co-mouldable tube which, while maintaining the advantages of the known co-mouldable tubes, namely that of withstanding the possible formation of ferrous oxides due to the presence of water vapour and condensate, typically present in most washing cycles, is in any case not subject to the aforementioned drawbacks, namely allows maintenance to be carried out in a rapid and low-cost manner if needed.

According to the present disclosure a co-mouldable tube having the characteristic features set forth in the attached claims is provided.

BRIEF DESCRIPTION OF THE DRAWINGS

The present disclosure will now be described with reference to the accompanying drawings which illustrate a non-limiting example of embodiment thereof, in which.

DETAILED DESCRIPTION

Figure 1:
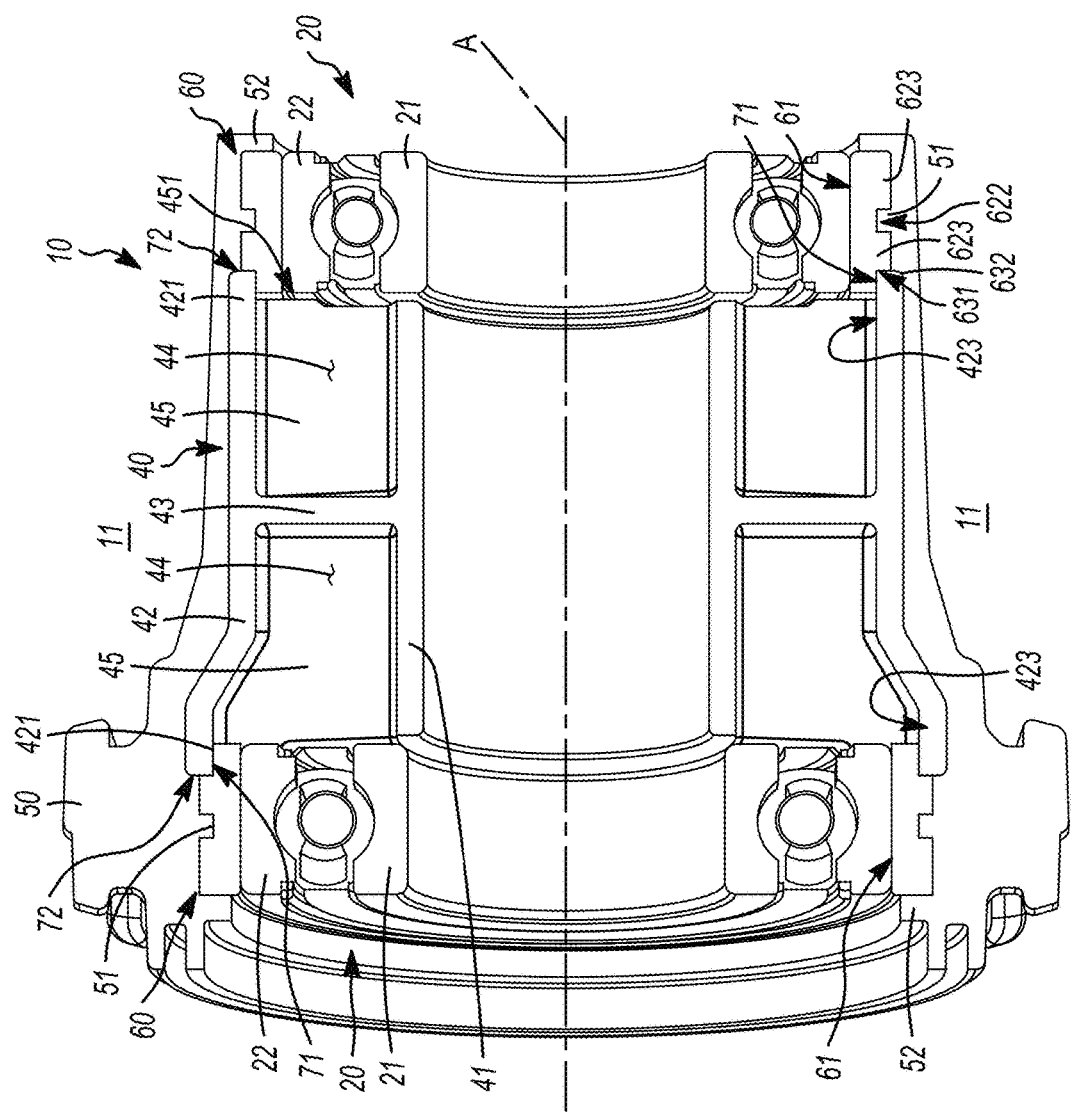
FIG. 1 is an axially sectioned view of a preferred embodiment of the co-mouldable tube according to the present disclosure.

With reference to the attached figures, 10 indicates overall a tube which is co-mouldable preferably, but not necessarily, with washing machine tubs, or with any other fixed structural element, and is designed to support, if co-moulded with a tub, a washing machine drum, or any other part that rotates with respect to the said structural element.

For simplicity, the description which follows will make specific reference to the case where the tube 10 is co-moulded together with a tub, schematically shown in the figure and indicated by 11, of a washing machine so as to define a single component with the said tub 11 in such a way as to reduce the washing machine production time.

The tube 10 comprises:

- two rolling bearings 20 arranged along an axis A of rotation of a washing machine drum (known and not shown);
- a spacer 40, which is axially interposed between the two rolling bearings 20 and is made of polymer material; and
- a cylindrical containment sleeve 50 which, again with a view to optimizing production times and costs, is made, preferably of plastic material, by means of co-moulding around the two bearings 20 and the spacer 40.

Each rolling bearing 20 comprises a respective inner ring 21 and a respective outer ring 22, between which a respective row 23 of rolling elements, in particular balls, is interposed in order to allow the rotation of the inner ring 21 with respect to the corresponding outer ring 22.

The spacer 40 is made of plastic material, preferably, but necessarily, of glass-fibre reinforced polypropylene, and if both the sleeve 50 and the spacer 40 are made of the same plastic material, the process of co-moulding the former on the latter may also result in intrinsic bonding together of a superficial portion of the spacer 40 and the sleeve 50, making the entire structure of the tube 10 even more rigid. According to embodiments, not shown herein, but easily deducible from that described here, the spacer 40 may also be made of polybutylene terephthalate reinforced with glass fibres, or in any case with similar plastic materials suitable for being injected in a semi-liquid state into a mould in order to give the spacer 40 a structure which will be described hereinafter.

The spacer 40 has a box-like structure and comprises an internal cylindrical body 41, a shaped external body 42 coaxial with the body 41, and an intermediate radial partition wall 43 which is arranged transversely with respect to the axis A and extends radially from the body 41 to the body 42 in a substantially intermediate position along the said spacer 40 so as to render the body 41 integral with the body 42. The bodies 41 and 42 define, with the partition wall 43, two annular spaces 44 which are such that the overall weight of the spacer 40 is less than the weight of a solid spacer while ensuring the same rigidity characteristics. The spacer 40 also comprises a plurality of axial ribs 45 which are arranged inside the spaces 44 parallel to the axis A and around the axis A, are made as one piece with and of the same material as the partition wall 43 and the bodies 41 and 42, and have respective shaped outer axial profiles 451.

The external shaped body 42 comprises two axially opposite cylindrical ends 421 which extend axially beyond the internal cylindrical body 41 and also beyond the outer axial profiles 451 of the axial ribs 45, so as to define respective cylindrical assembly seats 423 with the said axial ribs 45, or more precisely with the said axial profiles 451, the shapes of which are such as to be arranged substantially flush with the cylindrical body 41 and to be axially inset with respect to the opposite cylindrical ends 421.

The co-mouldable tube 10 also comprises two metal bushes 60 which are interposed between the cylindrical sleeve 50 and the two rolling bearings 20 and are co-moulded directly with the said cylindrical sleeve 50. In particular, the bushes 60 are externally engaged, albeit partially, inside the seats 423 of the spacer 40, are co-moulded with the cylindrical sleeve 50 along the part which is not engaged with the spacer 40, and are provided with a respective internal assembly seat 61 for a corresponding rolling bearing 20: each seat 61 houses inside it a corresponding bearing 20, essentially separating it radially from the cylindrical sleeve 50, and, since each assembly seat 61 remains axially open towards the outside of the tube 10 also after co-moulding thereof with the tub 11, the corresponding bush 60 allows possible extraction of the rolling bearings 20 from the said tube 10. In other words, the bushes 60 are interposed directly between the rolling bearings 20 and the cylindrical sleeve 50, preventing the sleeve 50 from being co-moulded onto the former, and are also partially interposed between the rolling bearings 20 and the spacer 40, allowing the former to be extracted from the tube 10 even after co-moulding thereof with the tub 1.

Since the bushes 60 must in any case ensure the assembly and positioning of the rolling bearings 20, i.e. must be both axially abutted against the spacer 40 and firmly secured inside the sleeve 50, they comprise both respective gripping elements 62 situated on the outside of the assembly seats 61 and coupled with the sleeve 50, and respective axial engaging and locating elements 63, also situated on the outside of the assembly seats 61 and coupled with a corresponding opposite end 421 of the spacer 40.

Figure 2:
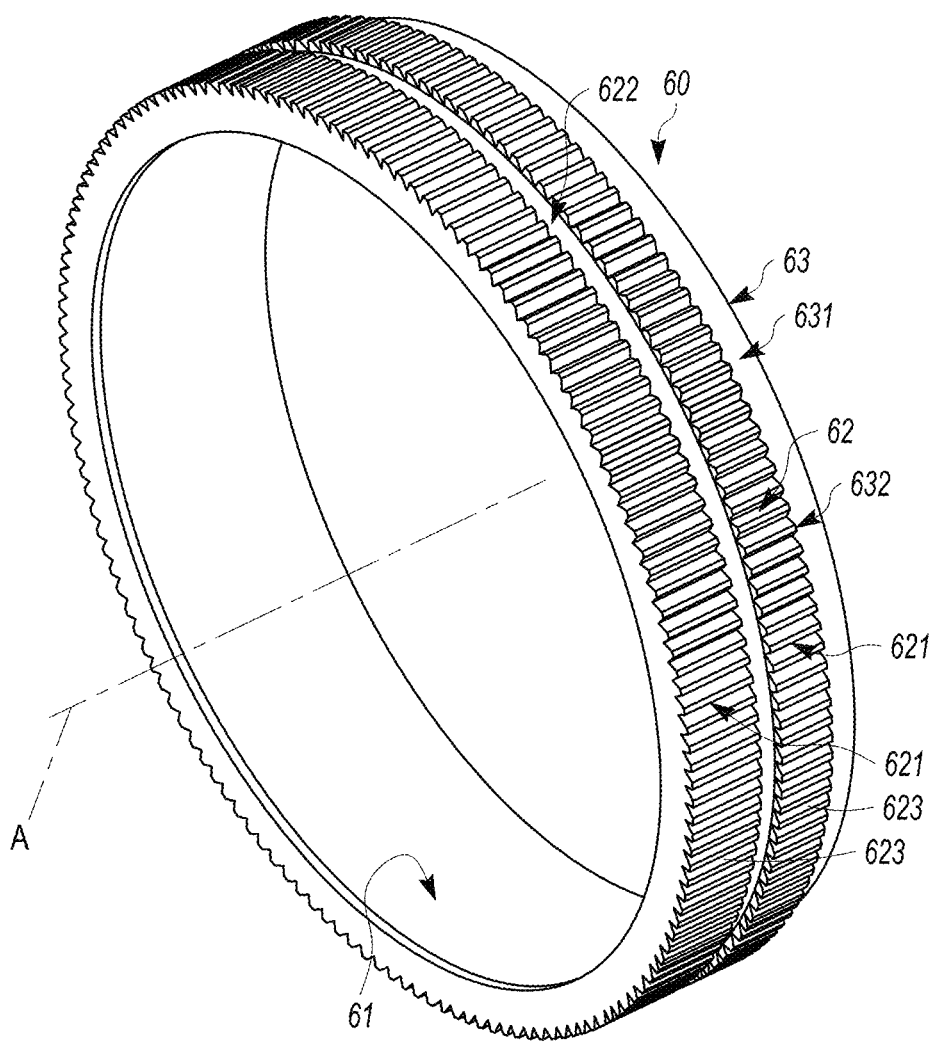
FIG. 2 is a perspective view of a detail of the co-mouldable tube according to FIG. 1.

According to the preferred embodiment of the tube 10 shown in the attached figures and, more particularly in FIG. 2, the gripping elements 62 comprise a plurality of axial external grooves 621 and a circumferential external grooving 622 formed in an axially intermediate position between the axial outer grooves 621. The grooves 621 define between them respective radial teeth 623 and are totally filled by the plastic material of the sleeve 50 during co-moulding of the sleeve 50 with the assembly formed by the spacer 40, bushes 60 and bearings 20, causing the gripping, together with the radial teeth 623, of the bushes 60 to the sleeve 50 and resulting in a firm connection circumferentially of the bushes 69 with the sleeve 50. Also the circumferential outer grooving 622 which basically divides the axial outer grooves 621 and the radial teeth 623 into two substantially similar parts, is totally filled by the plastic material of the sleeve 50 during co-moulding of the sleeve 50 with the assembly formed by the spacer 40, bushes 60 and bearings 20, forming in the sleeve 50 itself, a radial tooth 51 which, being inserted inside the external grooving 622, determines a firm connection in the axial direction between the bushes 60 and the sleeve 50.

The axial engaging and locating elements 63 comprise, for each bush 60, a cylindrical flat surface 631 arranged laterally with respect to the respective axial outer grooves 621, and an axial abutment shoulder 632 defined by the said axial outer grooves 621 or, more precisely, by the radial teeth 623. The cylindrical flat surfaces 631 are engaged radially on the inside of the axially opposite cylindrical ends 421, while the axial shoulders 632, which axially delimit on one side the corresponding cylindrical flat surfaces 631, are arranged axially against the axially opposite cylindrical ends 421, resulting in exact axial positioning of the two bushes 61 with respect to each other. In particular and for greater descriptive clarity, each cylindrical end 421 is radially delimited by a respective cylindrical surface 71, defining essentially the corresponding seat 423 for engagement with the flat surface 631 of the corresponding bush 60, and by a respective annular end surface, transverse to the axis A and to the surface 71 for axial abutment with the axial shoulder 632 of the corresponding bush 60: the axial distance between the two annular end surfaces 72 determines the axial distance for assembly of the bushes 60 as well as the rolling bearings 20, the axial positioning of which is further improved, as will be explained in greater detail below, by means of the ribs 45.

The bushes 60 have an axial width with dimensions equal to the axial width of the rolling bearings 20, and the seats 61 likewise have an axial width with dimensions equal to an axial width of the outer rings 22 which are mounted integrally, albeit in such a way that they can be uncoupled, inside the corresponding seats 61, which are axially open on both sides: but if the opening towards the outer side of the tube 10 allows, as already described, the extraction, if required, of the rolling bearings from the said tube 10, the opening towards the inner side of the tube 10 allows the positioning of the outer rings 22 axially against the axial ribs 45, the shaped outer profiles 451 of which ensure that, while the outer rings 22 effectively positioned against the ribs 45, the inner rings 21 are instead axially spaced from the said ribs 45 so as to allow the rotation with respect to the said inner rings 22.

Finally, the cylindrical containment sleeve 50 comprises, for each metal bush 60, a respective radial containment edge 52 which is axially opposite to the corresponding cylindrical flat surface 631 in relation to the axial outer grooves 621 and axially locks the corresponding metal bush 60 against the surface 72 of the corresponding opposite end 421 of the spacer 40.

From the above description it is clear that the bushes 60 with which the co-mouldable tube according to the present disclosure is provided allow both precise assembly of the rolling bearings 20 inside the spacer 40 and, in particular, separate the outer rings 22 of the rolling bearings 20 from the cylindrical containment sleeve 50, thereby avoiding the need for the latter to be directly co-moulded on them. In other words, the bushes 60 render the rolling bearings 20 independent of the cylindrical containment sleeve 50 and allow them to be rapidly replaced if necessary, also owing to the axially open configuration of its internal seats 61.

Moreover, although the bushes 60 are made of metallic material, like the inner and outer rings 21 and 22 of the rolling bearings 20, the formation on them of the gripping elements 62 and the axial engaging and locating elements 63 may be performed in a decidedly more economical manner and with costs which are reduced such as to make absolutely competitive the use of an additional constructional element such as, precisely, the bushes 60 which are to be coupled with the rolling bearings 20 and the spacer 40.

Finally, the grooves 621 and the associated teeth 623 may be formed in a number chosen specifically depending on the type of application of the co-mouldable tube 10 and, likewise, the circumferential external grooving 622 may be formed with a specific axial width and with an axial position on the inside of the grooves 621 and the associated teeth 623 again depending on the type of application of the co-mouldable tube 10, resulting therefore in a not only substantially free, but also certainly wider choice as to the type of rolling bearing 20 to be used.

It is understood that the present disclosure is not limited to the embodiment described and illustrated here, which is to be regarded as an example of embodiment of the co-mouldable tube 10, which is instead subject to further modifications with regard to forms and arrangements of parts, constructional details and assembly. In fact, as has been reiterated several times, the tube 10 is not only suitable for being used in applications which are not strictly linked to washing machines and the associated tubs, but is advantageously usable in other applications in which the tube 10, for reasons of simpler production, must be co-moulded with a fixed support and must support a part that rotates relative to the fixed support, all of which always ensuring at the same time adequate rigidity characteristics as well as a sealing capacity against atmospheric agents such as humidity, water vapour and the like and also facilitating maintenance with production costs which are in any case lower.

What is claimed is:

1. A co-mouldable tube comprising:
   two rolling bearings arranged along a respective axis of rotation;
   a spacer interposed between the two rolling bearings in order to provide the co-mouldable tube with structural rigidity; and
   a cylindrical containment sleeve co-moulded around the two rolling bearings and the spacer;
   two metal bushes interposed between the cylindrical containment sleeve and the two rolling bearings and co-moulded with the said cylindrical containment sleeve.

2. The co-mouldable tube according to claim 1, wherein the two metal bushes comprise respective assembly seats for each associated rolling bearing and are engaged in respective opposite ends of the spacer.

3. The co-mouldable tube according to claim 2, wherein the two metal bushes comprise axial engaging and locating means situated outside the assembly seats and coupled with a corresponding opposite end of the spacer.

4. The co-mouldable tube according to claim 3, wherein the two metal bushes comprise gripping means which are situated on the outside of the assembly seats and which are coupled with the cylindrical containment sleeve.

5. The co-mouldable tube according to claim 4, wherein the gripping means comprises a plurality of axial outer grooves and a circumferential external grooving formed between the axial outer grooves.

6. The co-mouldable tube according to claim 5, wherein the axial engaging and locating means comprises a cylindrical flat surface arranged laterally with respect to the axial outer grooves and engaged inside the respective opposite end of the spacer, and an axial abutment shoulder which is also defined by the said axial outer grooves and is mounted axially against the respective opposite end of the spacer.

7. The co-mouldable tube according to claim 6, wherein the cylindrical containment sleeve comprises, for each metal bush, respective containment edges which are situated axially opposite to the corresponding cylindrical flat surfaces in relation to the axial outer grooves and axially lock the corresponding metal bush against the corresponding opposite end of the spacer.

* * * * *